(12) United States Patent
Chen

(10) Patent No.: US 7,342,777 B2
(45) Date of Patent: Mar. 11, 2008

(54) NOTEBOOK COMPUTER HAVING ADJUSTABLE SCREEN WITH TELESCOPIC ELEMENT

(75) Inventor: Chi-Hung Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 16 days.

(21) Appl. No.: 11/519,905

(22) Filed: Sep. 13, 2006

(65) Prior Publication Data

US 2007/0066107 A1 Mar. 22, 2007

(30) Foreign Application Priority Data

Sep. 16, 2005 (TW) .............................. 94132143 A

(51) Int. Cl.
*G06F 1/16* (2006.01)
(52) U.S. Cl. ...................... 361/681; 361/683; 248/917; 248/919; 248/920; 312/223.1; 312/333
(58) Field of Classification Search ................ 361/681, 361/683; 248/917–924; D14/315, 316; 312/223.1, 223.2, 333; 285/147.2; 16/362–367
See application file for complete search history.

(56) References Cited

U.S. PATENT DOCUMENTS 5,205,017 A * 4/1993 Wang ........................... 16/367
5,278,779 A * 1/1994 Conway et al. ............. 361/680
5,683,064 A * 11/1997 Copeland et al. ......... 248/278.1
6,016,171 A * 1/2000 Tsao ............................ 348/836
6,064,373 A * 5/2000 Ditzik ......................... 345/173
6,233,138 B1 * 5/2001 Osgood ...................... 361/681
6,819,550 B2 * 11/2004 Jobs et al. ................... 361/683
7,091,961 B2 * 8/2006 Ditzik ......................... 345/173
7,251,128 B2 * 7/2007 Williams et al. ............ 361/683
2004/0079849 A1 * 4/2004 Rudolf ...................... 248/276.1

* cited by examiner

*Primary Examiner*—Jayprakash Gandhi
*Assistant Examiner*—Anthony Q Edwards
(74) *Attorney, Agent, or Firm*—Birch, Stewart, Kolasch & Birch, LLP

(57) ABSTRACT

A notebook computer includes a first housing having a computer host and a second housing having a screen. A base is positioned inside the first housing for supporting a first end of a rod. A sliding element and a locking element are positioned on the rod. The sliding element is fixed inside the second housing. The locking element is capable of fixing the sliding element on the rod. There is a spheroid positioned at a second end of the rod, and the sliding element is capable of rotating along the surface of the spheroid when the sliding element is at the second end of the rod.

12 Claims, 10 Drawing Sheets

NOTEBOOK COMPUTER HAVING ADJUSTABLE SCREEN WITH TELESCOPIC ELEMENT

BACKGROUND OF THE INVENTION

1. Field of the Invention

The present invention relates to a notebook computer, and more particularly, to a notebook computer having an adjustable screen.

2. Description of the Prior Art

Manufacturers are dedicated to reducing the weight and size of notebook computers. In addition, handwriting input is also being added to such products to provide more flexibility.

However, it is sometimes inconvenient to use a notebook computer. For instance, if a notebook computer is placed on a table, when a user watches a video or reads documents via the notebook computer, if the table is too low or the chair the user is sitting on is too high, the height of a screen of the notebook computer is not suitable. To solve this problem, the user has to find something to place under the notebook computer (to elevate it) so that he or she feels more comfortable when watching video or reading documents.

SUMMARY OF THE INVENTION

The claimed invention discloses a notebook computer. The notebook computer comprises a first housing, a second housing, and a telescopic element. There is a computer host inside the first housing, and a screen is positioned on the second housing for displaying information transmitted from the computer host. The telescopic element comprises a base, a rod, a sliding element, and a locking element. The base is positioned inside the first housing. A first end of the rod is positioned on the base, and a spheroid is positioned at a second end of the rod. The sliding element is fixed inside the second housing, and the locking element fixes the sliding element on the rod. The sliding element is capable of rotating along the surface of the spheroid when the sliding element is at the second end of the rod.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
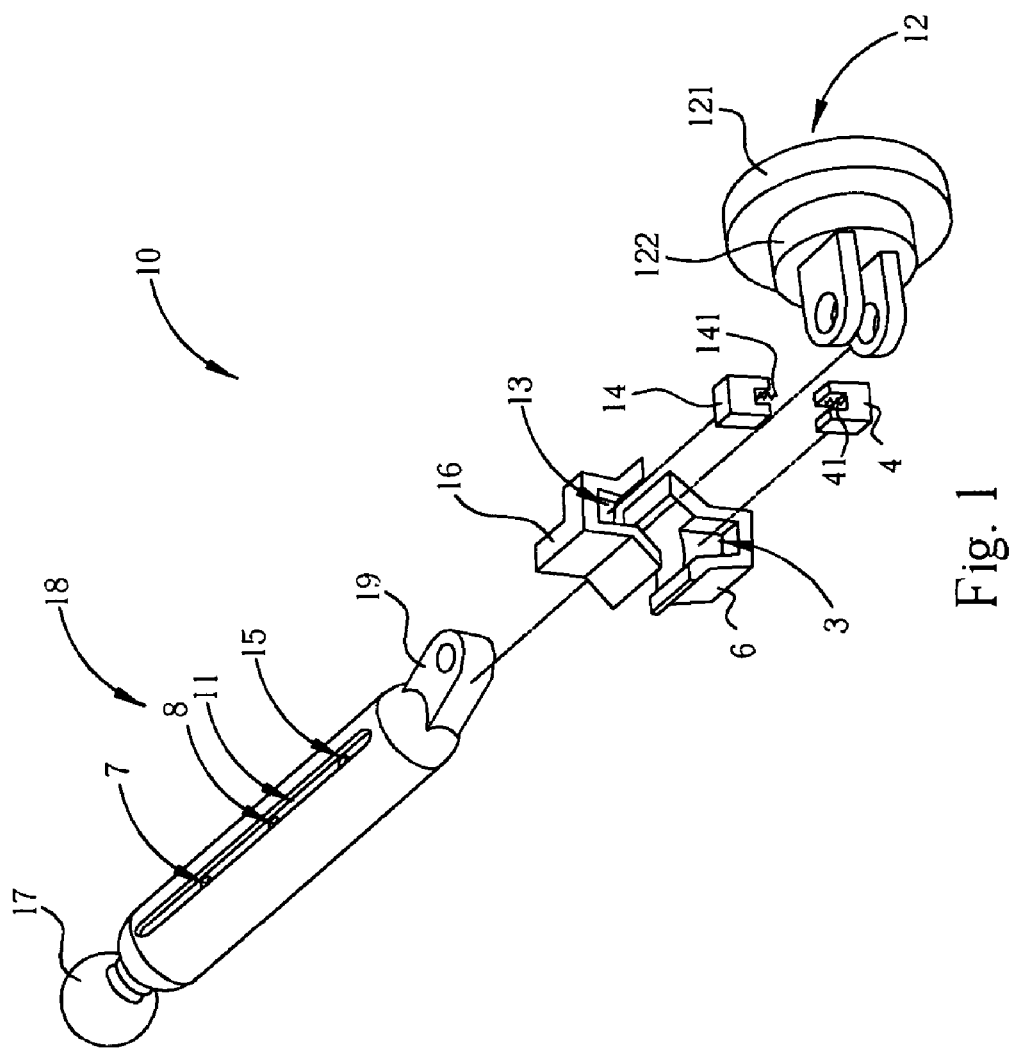
FIG. 1 is an exploded diagram of a telescopic element according to the present invention.

Please refer to FIG. 1, which is a diagram of a telescopic element 10 according to the present invention. The telescopic element 10 comprises a base 12, a rod 18, two sliding elements 16, 6, and two locking elements 14, 4. There is a recess 13, 3 in each sliding element 16, 6 for accommodating the locking elements 14, 4, respectively. The rod 18 comprises a track 11, on which the sliding elements 16, 6 slide back and forth. A first end 19 of the rod 18 is fixed on a fixing element 122 of the base 12. There is a spheroid 17 positioned at a second end of the rod 18. When the sliding elements 16, 6 are positioned at the second end of the rod 18 via the locking elements 14, 4, the sliding elements 16, 6 are capable of rotating along the surface of the spheroid 17. There is a plurality of holes 7, 8, 15 on the rod 18, so that the locking elements 14, 4 are capable of fixing the sliding elements 16, 6 on the rod 18. Additionally, each locking element 14, 4 comprises a spring 141, 41. The springs 141, 41 can be flexible pieces or other flexible elements.

Figure 2:
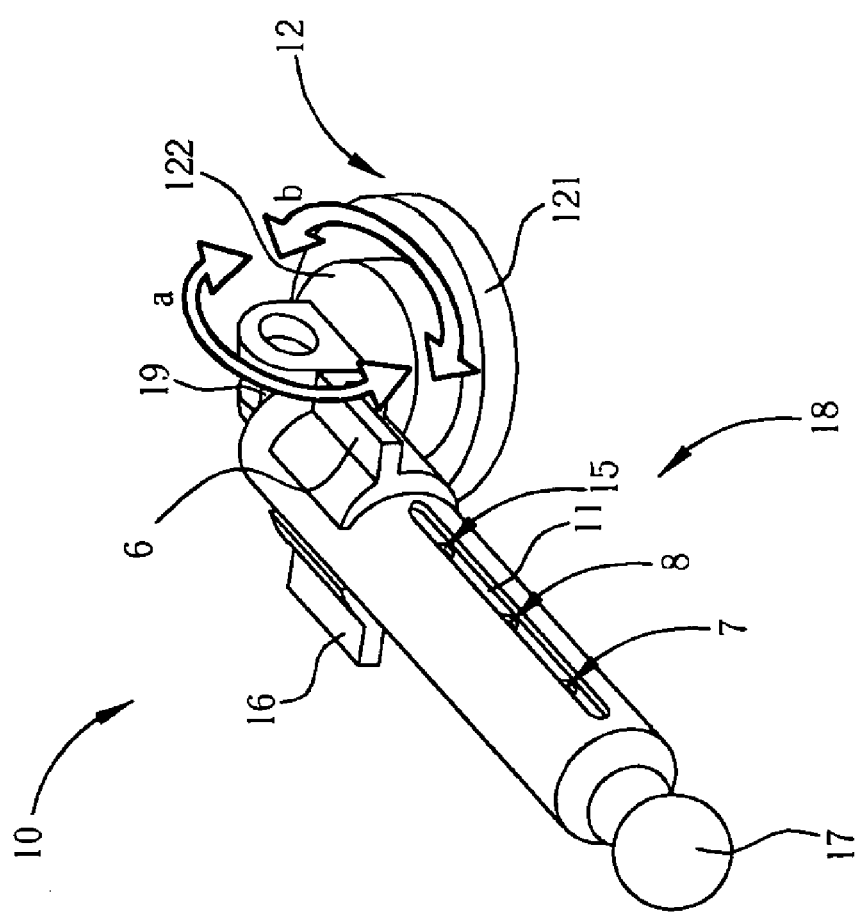
FIG. 2 shows a combination of all elements of FIG. 1.
Figure 3:
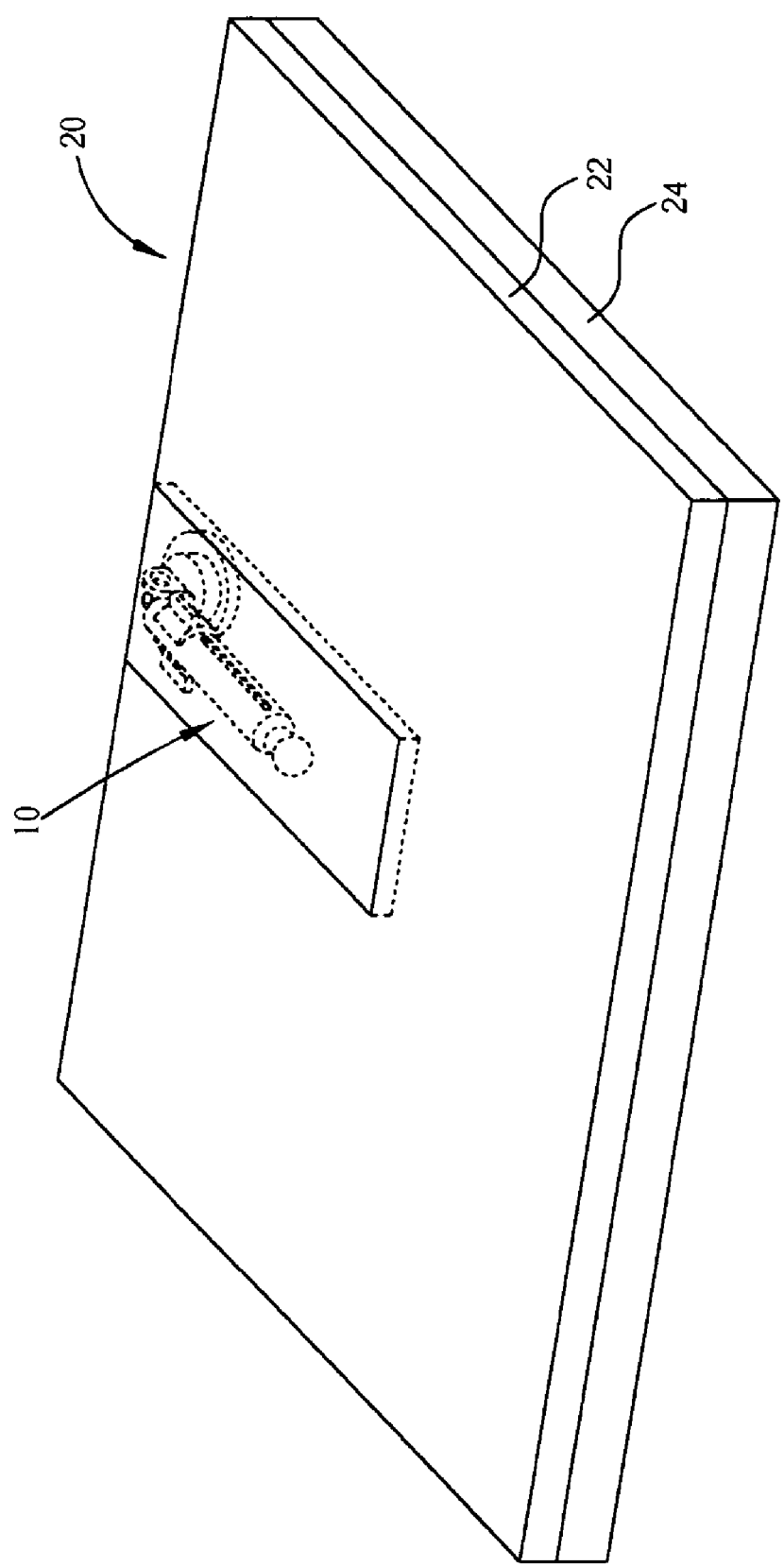
FIG. 3 shows the telescopic element of the present invention connected to a notebook computer.

Please refer to FIG. 2, which shows a combination of all elements of FIG. 1. When the fixing element 122 is capable of rotating relative to a base piece 121 of the base 12, the rod 18 is capable of rotating not only in direction a, but also in direction b. When the fixing element 122 is not capable of rotating relative to the base piece 121 of the base 12, the rod 18 is capable of only rotating in direction a. The telescopic element 10 of FIG. 2 is connected to a notebook computer. Please refer to FIG. 3, which shows the telescopic element 10 of the present invention connected to a notebook computer 20. The notebook computer 20 comprises a first hosing 22 and a second housing 24. The base 12 of the telescopic element 10 is fixed inside the first housing 22, and the sliding elements 16, 6 are positioned inside the second housing 24, such that the second housing 24 is capable of moving with the sliding elements 16, 6. Therefore, the height of the second housing 24 can be adjusted with the sliding elements 16, 6 sliding on the track 11 of the rod 18.

Figure 4:
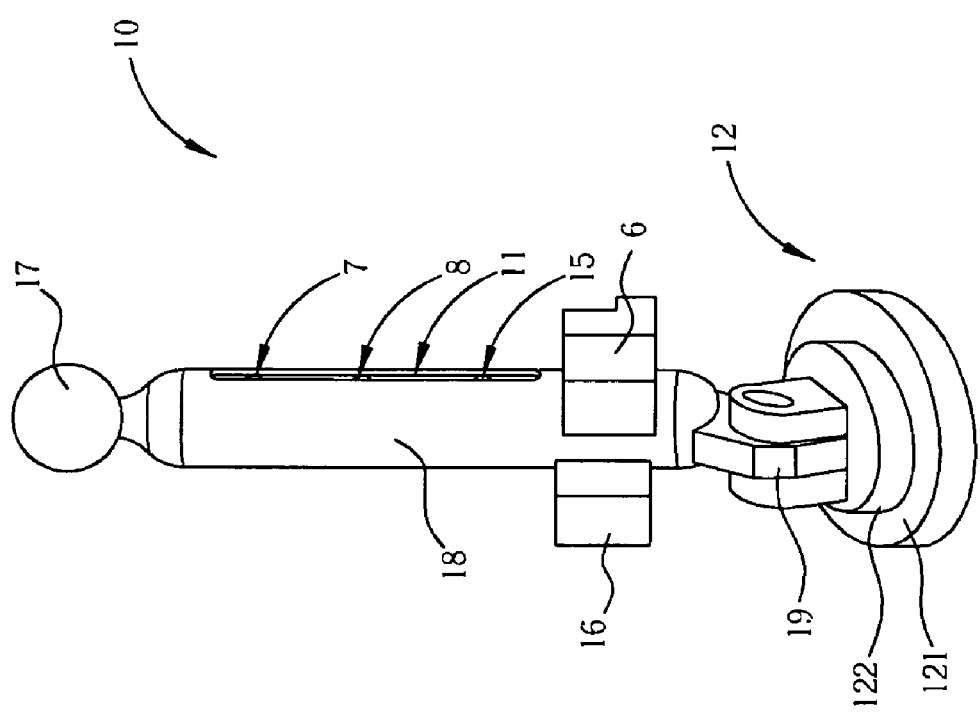
FIG. 4 to FIG. 7 show the positions of the telescopic element and the notebook computer of the present invention when opening and closing the notebook computer.
Figure 5:
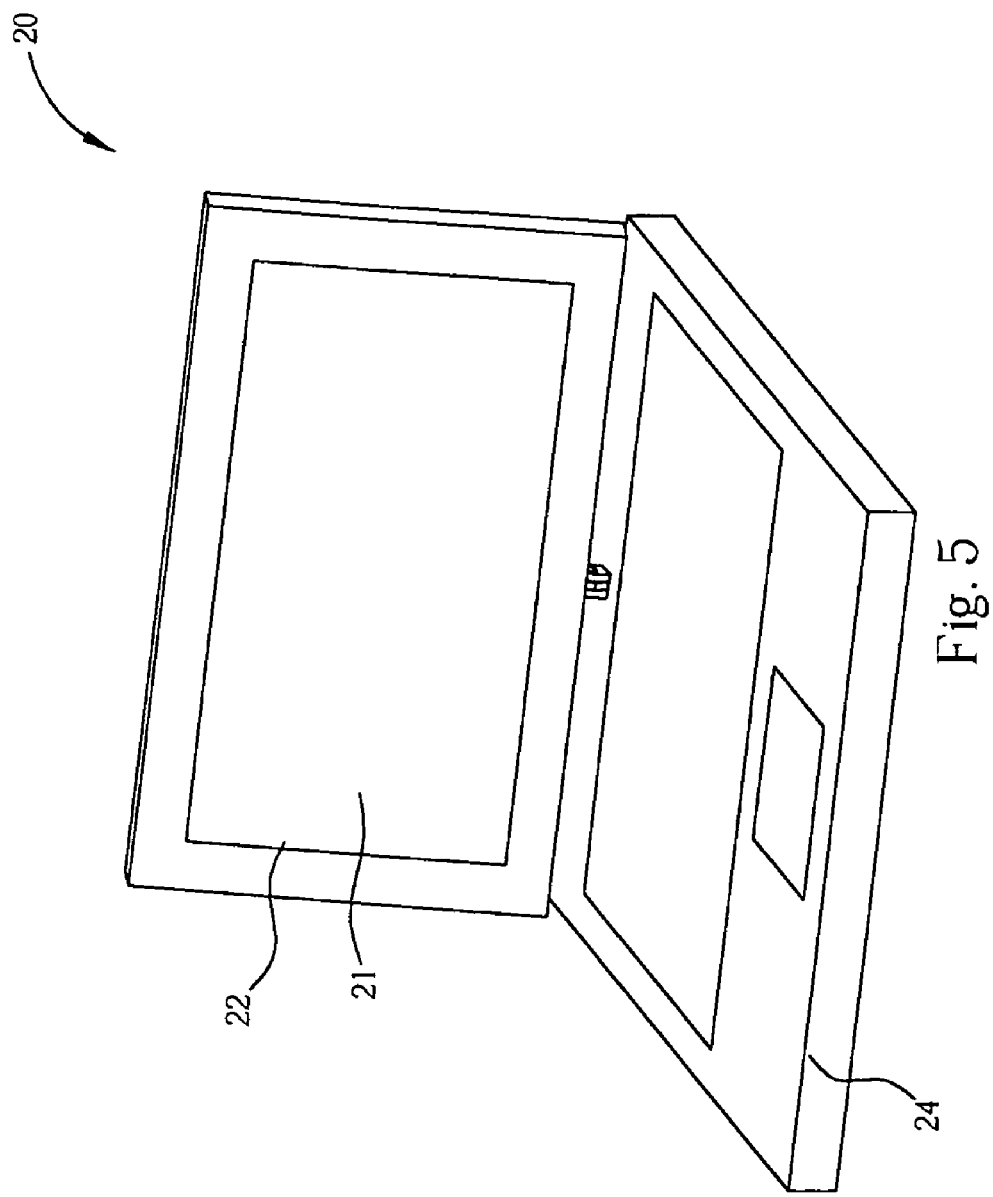

FIG. 4 shows the position of the telescopic element 10 when opening the notebook computer 20, and FIG. 5 shows the position of the notebook computer 20 corresponding to FIG. 4. The second housing 24 comprises a computer host, and the first housing 22 comprises a screen 21 coupled to the computer host for displaying information transmitted from the computer host. As mentioned above, when the fixing element 122 is capable of rotating relative to the base piece 121 of the base 12, the rod 18 is capable of rotating in directions a and b. Therefore, the screen 21 is capable of rotating 360 degrees (rotating in direction b).

Figure 6:
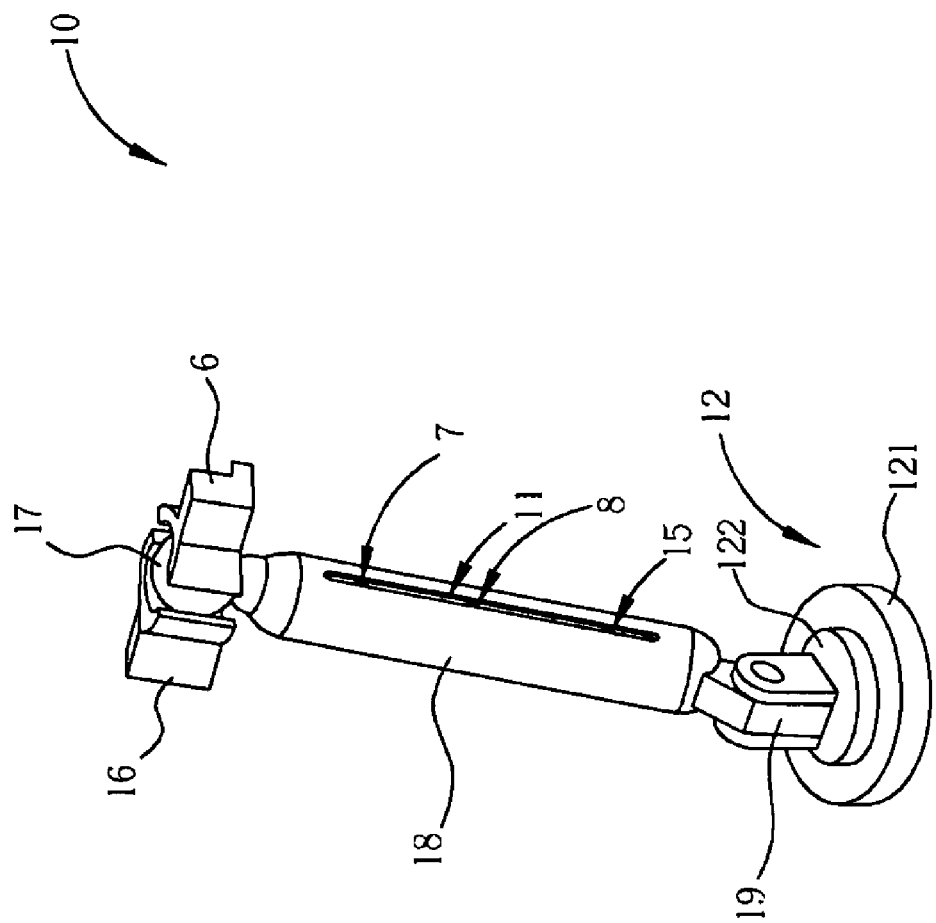
Figure 7:
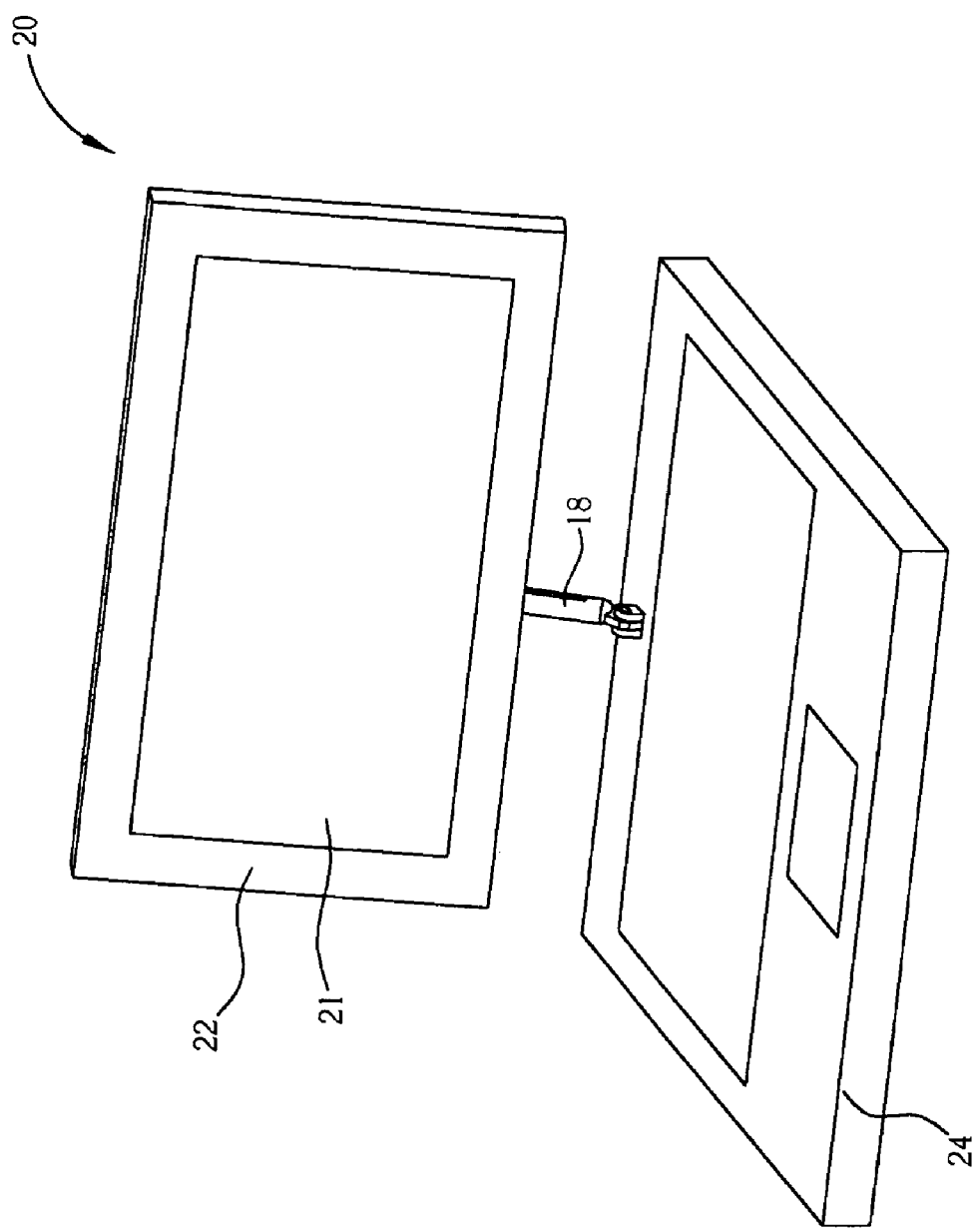

When adjusting the height of the screen 21, the sliding element is slid along the track 11 of the rod 18, then according to the required height of the screen 21, the locking elements 14,4 is locked in holes 7, 8, 15 or at the second end of the rod. Please refer to FIG. 6, which shows the sliding elements 16, 6 positioned at the second end of the rod 18. FIG. 7 shows the position of the notebook computer 20 corresponding to FIG. 6. The rod 18 is not limited as the round rod of FIG. 1, and it can be a rectangular rod or other shape allowing the sliding element 16 to slide there-along.

Figure 8:
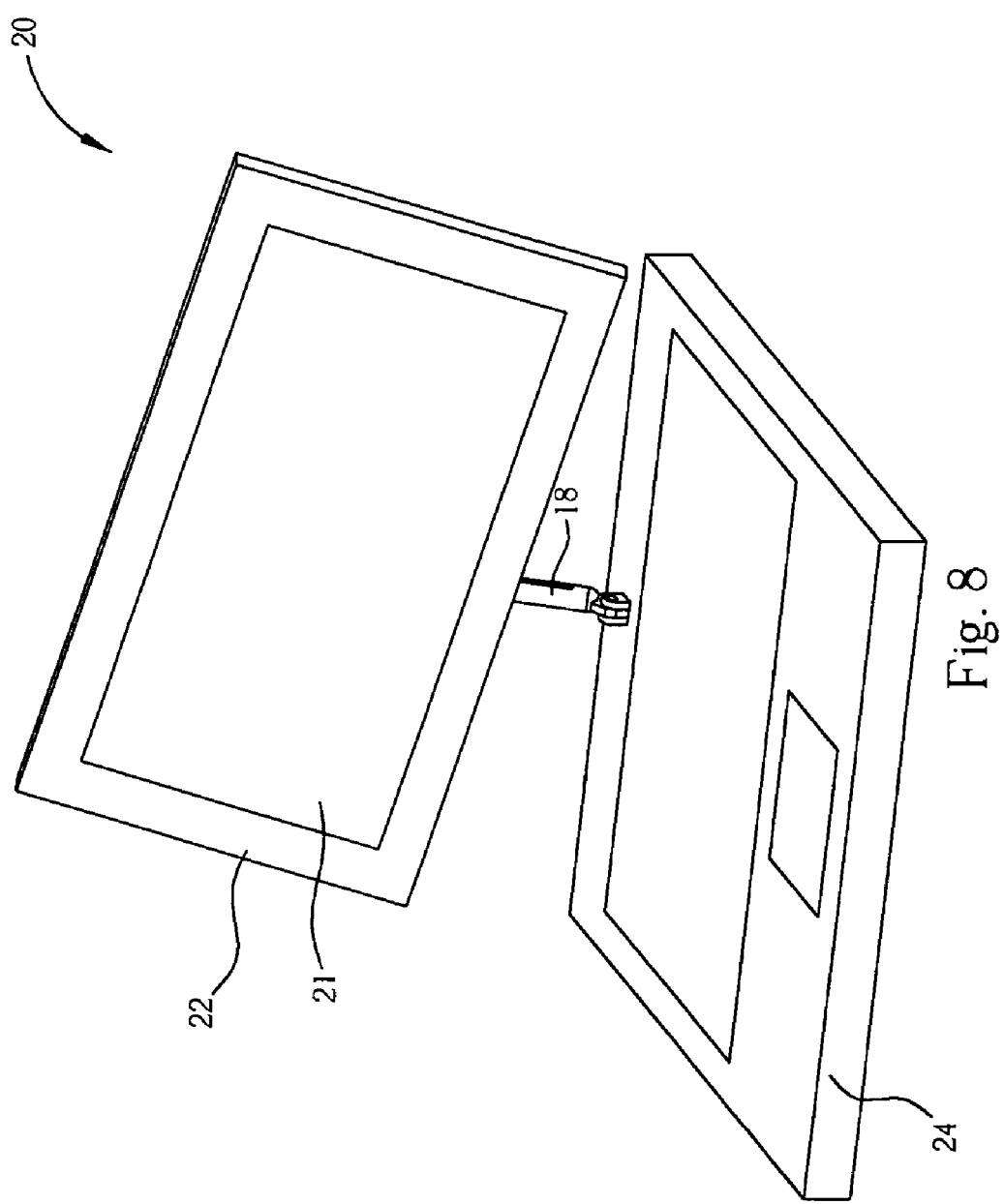
FIG. 8 to FIG. 10 show the notebook computer of the present invention rotating or tilting via the telescopic element.
Figure 9:
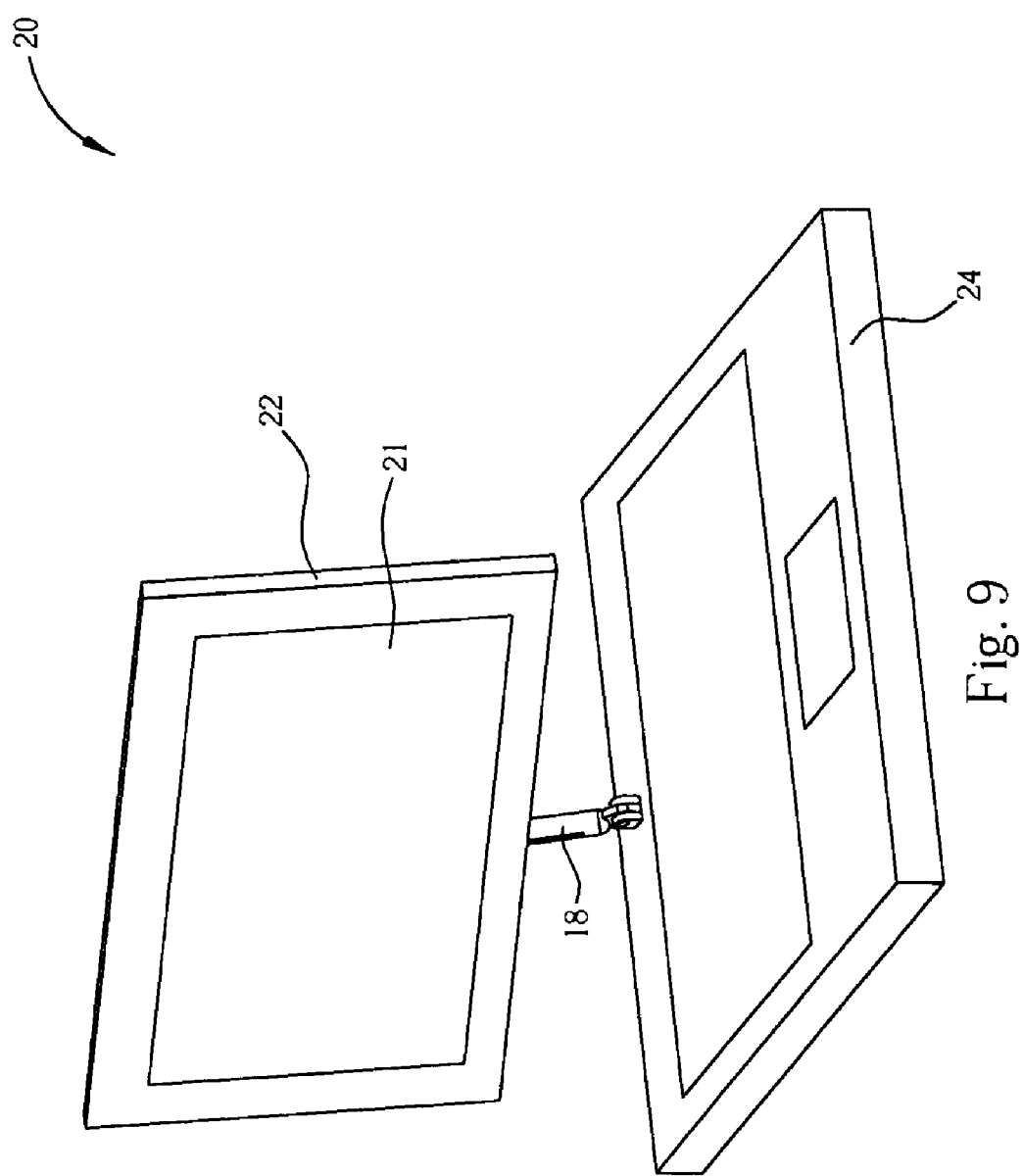
Figure 10:
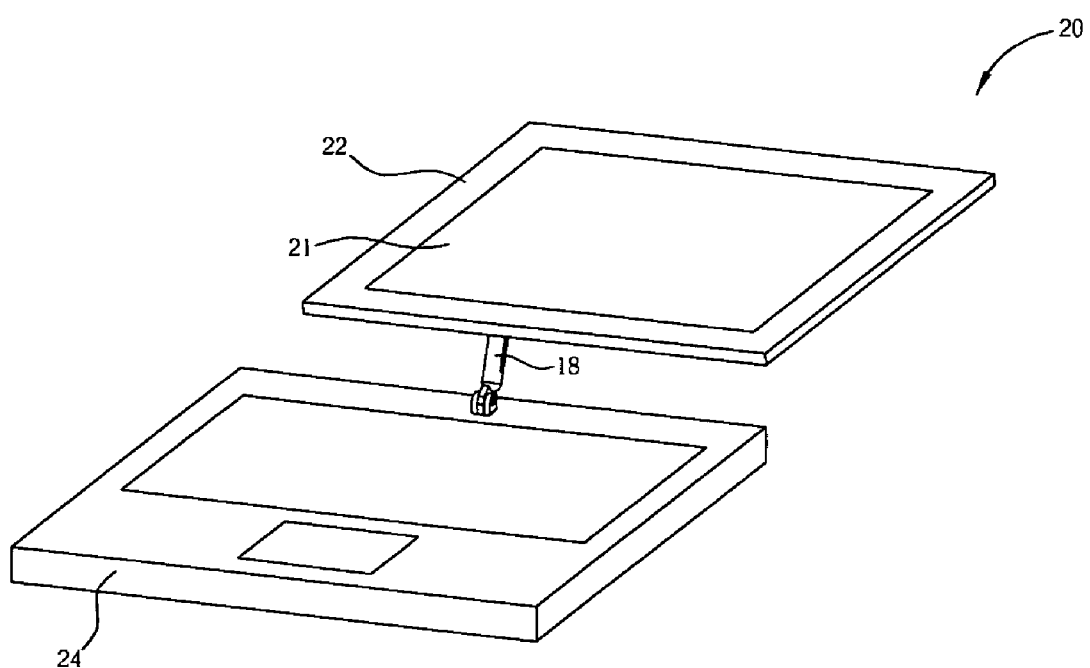

Please refer to FIG. 8 to FIG. 10, which show the notebook computer 20 of the present invention rotating or tilting via the telescopic element 10. When the sliding elements 16, 6 are at the second end of the rod 18, the sliding elements 16, 6 are capable of rotating along the surface of the spheroid 17 positioned at the second end of the rod 18. FIG. 8 shows the second housing 24 tilted to right; FIG. 9 shows the second hosing 24 rotated to left; and FIG. 10 shows the second housing 24 tilted backward. The above are some examples of the range of motion of the second housing 24, and are not limiting.

With the present invention telescopic element connected to the notebook computer, a user can more flexibly watch video or read documents via the screen of the notebook computer. If a table is too low or a chair the user sitting on is too high, the user can simply adjust the height or angle of the screen. Additionally, with the telescopic element, the notebook computer's screen can be rotated and tilted in any direction.

Those skilled in the art will readily observe that numerous modifications and alterations of the device and method may be made while retaining the teachings of the invention. Accordingly, the above disclosure should be construed as limited only by the metes and bounds of the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A notebook computer comprising:
   a first housing comprising a computer host;
   a second housing, a screen being positioned on the second housing for displaying information transmitted from the computer host; and
   a telescopic element comprising:
     a base positioned inside the first housing;
     a rod having a first end positioned on the base, a spheroid being positioned at a second end of the rod;
     a sliding element fixed inside the second housing for sliding along the rod; and
     a locking element for fixing the sliding element on the rod;
   wherein the sliding element is capable of rotating along the surface of the spheroid when the sliding element is at the second end of the rod.

2. The notebook computer of claim 1, wherein the rod includes a plurality of notches for assisting the locking element in fixing the sliding element.

3. The notebook computer of claim 1, wherein the rod includes a track for placing the sliding element.

4. The notebook computer of claim 1, wherein the rod is a rectangular rod or a round rod.

5. The notebook computer of claim 1, wherein the base is a rotatable base or a fixed base.

6. The notebook computer of claim 1, wherein the locking element includes a spring or flexible piece for fixing the sliding element on the rod.

7. A telescopic element comprising:
   a base;
   a rod having a first end positioned on the base, a spheroid being positioned at a second end of the rod;
   a sliding element for sliding along the rod; and
   a locking element for fixing the sliding element on the rod;
   wherein the sliding element is capable of rotating along the surface of the spheroid when the sliding element is at the second end of the rod.

8. The telescopic element of claim 7, wherein the rod includes a plurality of notches for assisting the locking element in fixing the sliding element.

9. The telescopic element of claim 7, wherein the rod includes a track for placing the sliding element.

10. The telescopic element of claim 7, wherein the rod is a rectangular rod or a round rod.

11. The telescopic element of claim 7, wherein the base is a rotatable base or a fixed base.

12. The telescopic element of claim 7, wherein the locking element includes a spring or flexible piece for fixing the sliding element on the rod.

* * * * *